Patented June 2, 1942

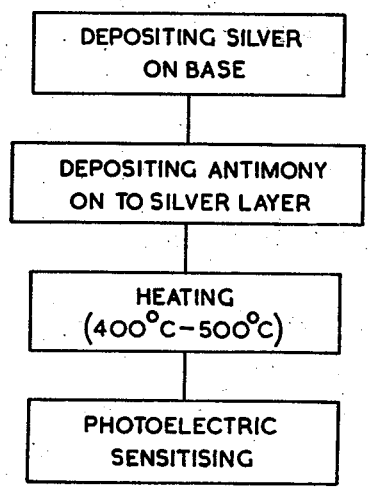
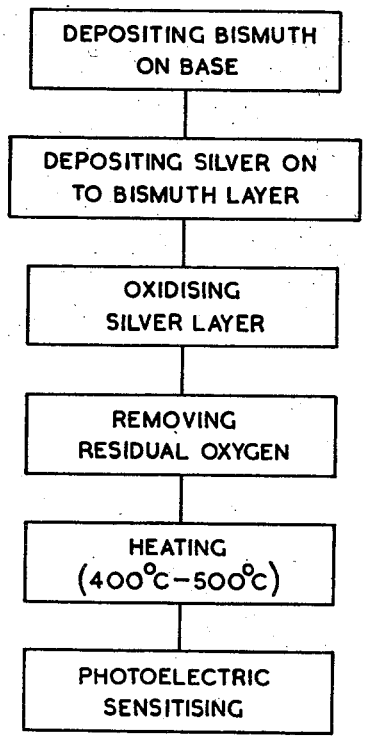

2,285,058

UNITED STATES PATENT OFFICE 2,285,058

METHOD OF MANUFACTURING MOSAIC ELECTRODES

Kurt Arthur Richard Samson, London, England, assignor, by mesne assignments, to Cinema-Television Limited, London, England, a British corporation Application June 12, 1940, Serial No. 340,047
In Great Britain July 24, 1939

12 Claims. (Cl. 250—167)

This invention relates to improvements in methods of manufacturing mosaic electrodes and is especially concerned with an improved method of manufacturing such electrodes by heating in vacuo a continuous metallic layer. It is found that a thin layer of, for example, silver, antimony or bismuth cannot be formed into a mosaic by heating in vacuo though in the presence of other substances such as oxygen or water vapour separation of a continuous volume of such metals into a mosaic of discrete particles will occur. The introduction of additional substances in order to form a mosaic is, however, disadvantageous for many reasons and it is an object of the present invention to provide a method of forming mosaic electrodes in which this, among other disadvantages of previous methods, is overcome.

According to the invention there is provided a method of manufacturing a mosaic electrode which comprises evaporating more than one metal onto a supporting member to form a composite layer of different metals, and heating the composite layer thus formed in vacuo to cause the formation of a mosaic.

Again according to the invention, there is provided a method of manufacturing a mosaic electrode which comprises evaporating a layer of metal onto a supporting member, evaporating onto said layer a layer of a further metal and heating the composite layer thus formed to cause the formation of a mosaic.

According to a feature of the present invention the properties of the metals forming the composite layer are such that one of them alone cannot be formed into a mosaic by heating a thin layer thereof in vacuo.

According to a further feature of the present invention the composite layer is superficially oxidised before the heat treatment.

As an example of the method according to the present invention the manufacture of a mosaic electrode comprising silver and antimony will now be described. Silver is first evaporated onto a supporting member, such as a mica plate, until the transparency is reduced to 30 to 40%. At this stage the colour of the deposited layer changes from rose to purple. Antimony is then evaporated onto the silver layer until the transparency is reduced to about 5 to 10%. The composite layer is then heated to a temperature between 400 and 500° C. when it breaks up into a mosaic of mutually insulated particles which may then be rendered photoelectrically sensitive by the method described in United States Patent No. 2,192,418. Figure 1 of the drawing is a flow sheet of this process.

When certain metals other than antimony are to be used the above method may, in accordance with a feature of the present invention, be varied as described in the following example. A layer of bismuth is first evaporated onto a supporting member and is then followed by a further layer of silver. The silver layer is then oxidised by admitting oxygen at low pressure into the container and producing an electric discharge between the silver layer and another electrode. The residual oxygen is then removed by pumping and the oxidised layer is then heated as before until it breaks up into a mosaic. In this case the mosaic may be rendered photoelectrically sensitive as described in co-pending British application No. 21,059/39 (United States application No. 334,160). Figure 2 of the drawing is a flow sheet of this process.

The present invention is, of course, not limited to the specific examples given above as other metals may be employed in the method according to the present invention.

I claim:

1. A method of manufacturing a mosaic electrode which comprises evaporating more than one metal onto a supporting member forming thereby a composite layer of different metals, and breaking up the entire composite layer thus formed into a mosaic by heating it in vacuo.

2. A method of manufacturing a mosaic electrode which comprises evaporating a layer of metal onto a supporting member, evaporating onto said layer a layer of a further metal, and breaking up the entire composite layer thus formed into a mosaic by heating it.

3. A method of manufacturing a mosaic electrode which comprises evaporating onto an insulating supporting member a layer of silver, evaporating onto said silver a layer of antimony, and heating the composite silver-antimony layer until it breaks up into a mosaic of mutually insulated particles.

4. A method of manufacturing a mosaic electrode which comprises evaporating onto an insulating supporting member a layer of bismuth, evaporating onto said bismuth layer a layer of silver, and heating said composite bismuth-silver layer until it breaks up into a mosaic of mutually insulated particles.

5. A method of manufacturing a mosaic electrode which comprises evaporating more than one metal onto a supporting member forming thereby a composite layer of different metals, superficially oxidising the composite layer thus formed, and heating the composite layer in vacuo to cause it to break up into a mosaic.

6. A method of manufacturing a mosaic electrode which comprises evaporating a layer of metal onto a supporting member, evaporating onto said layer a layer of a further metal, superficially oxidising the composite layer thus formed, and heating the composite layer to cause it to break up into a mosaic.

7. A method of manufacturing a mosaic electrode as claimed in claim 4, wherein the composite layer is superficially oxidised before the heat treatment.

8. A method of manufacturing a mosaic electrode as claimed in claim 4, wherein the silver layer is oxidised by admitting oxygen at low pressure and producing an electric discharge between said silver layer and a further electrode.

9. A method of manufacturing a mosaic electrode which comprises evaporating more than one metal onto a supporting member forming thereby a composite layer of different metals, breaking up the entire composite layer thus formed by heating it in vacuo, and rendering the mosaic electrode thus formed photoelectrically sensitive.

10. A method of manufacturing a mosaic electrode which comprises evaporating a layer of metal onto a supporting member, evaporating onto said layer a layer of a further metal, breaking up the entire composite layer thus formed by heating it, and rendering the mosaic thus formed photoelectrically sensitive.

11. A method of manufacturing a mosaic electrode which comprises evaporating onto an insulating supporting member a layer of silver, evaporating onto said silver a layer of antimony, heating the composite silver-antimony layer until it breaks up into a mosaic of mutually insulated particles, and rendering the mosaic thus formed photoelectrically sensitive.

12. A method of manufacturing a mosaic electrode which comprises evaporating onto an insulating supporting member a layer of bismuth, evaporating onto said bismuth layer a layer of silver, heating said composite bismuth-silver layer until it breaks up into a mosaic of mutually insulated particles, and rendering the mosaic thus formed photoelectrically sensitive.

KURT ARTHUR RICHARD SAMSON.